Oct. 12, 1948.  L. C. DOANE  2,451,323
SHOCK RESISTANT RELAY
Filed May 11, 1946  4 Sheets-Sheet 1

INVENTOR
LEROY C. DOANE
BY
Moses, Nolte, Crews & Berry
ATTORNEYS

Oct. 12, 1948.                    L. C. DOANE                    2,451,323
                              SHOCK RESISTANT RELAY
Filed May 11, 1946                                          4 Sheets-Sheet 2
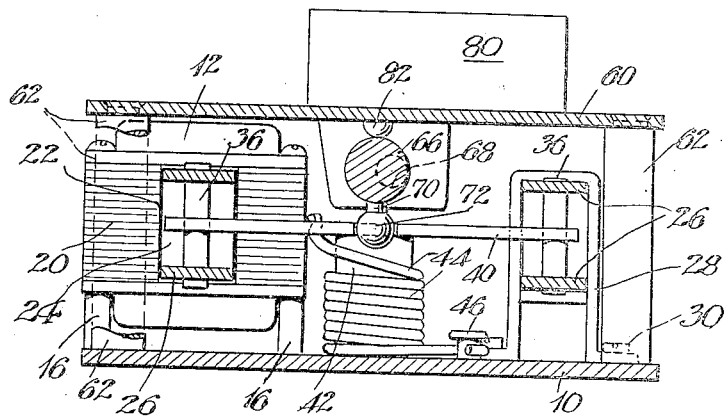
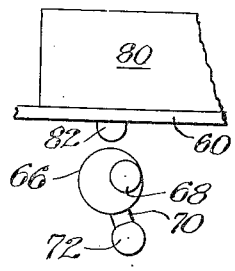 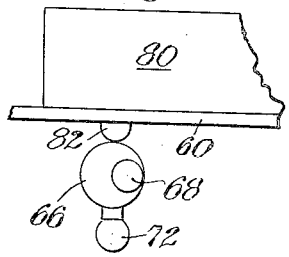 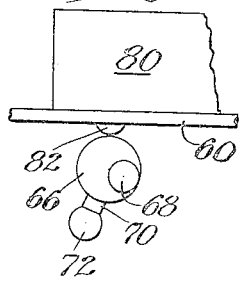
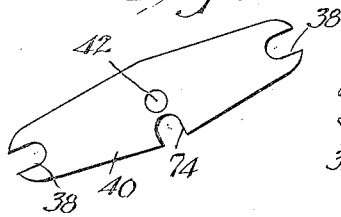 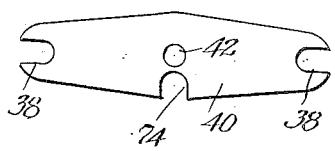 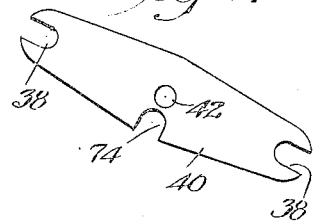
INVENTOR
LEROY C. DOANE
BY
Moses, Nolte, Crews & Berry
ATTORNEYS

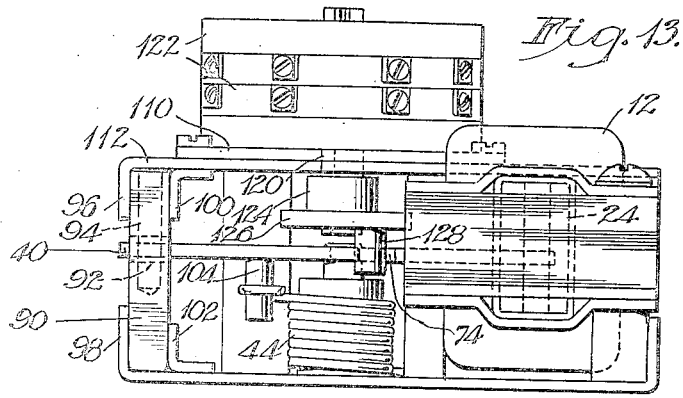
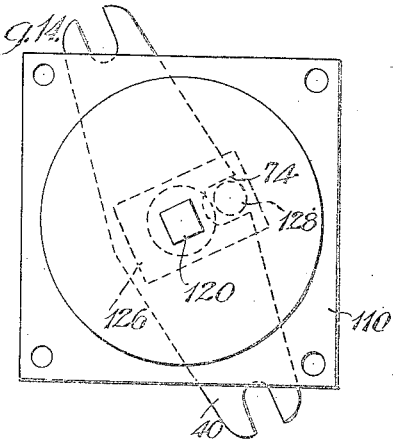
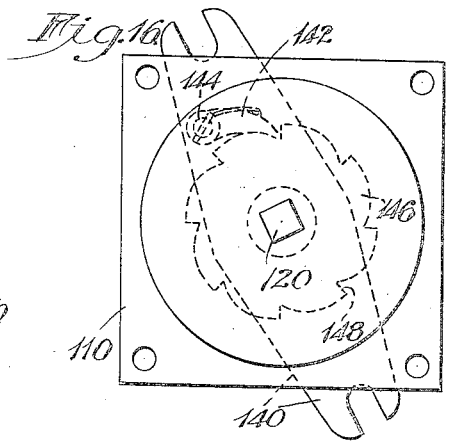
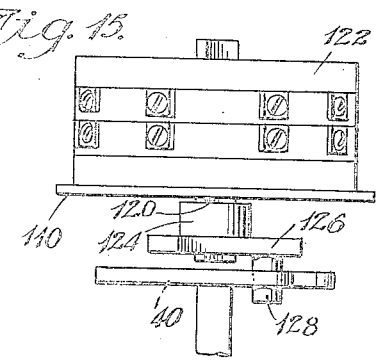
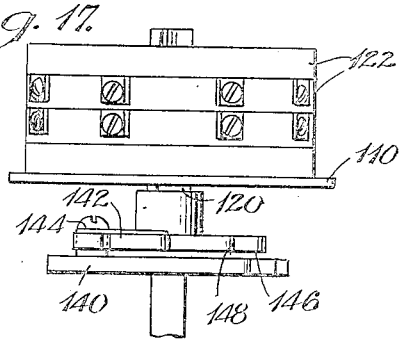

Patented Oct. 12, 1948

2,451,323

UNITED STATES PATENT OFFICE 2,451,323

SHOCK RESISTANT RELAY

Leroy C. Doane, Essex, Conn., assignor to The Sight Light Corporation, Deep River, Conn., a corporation of Connecticut Application May 11, 1946, Serial No. 669,026

5 Claims. (Cl. 200—98)

1

This invention relates to relays and particularly to solenoid-operated relays for actuating a plurality of switches or circuit-controlling devices.

The principal object of the invention is to provide a relay or device for operating a switch or switches by remote control which is capable of being used under the most severe conditions of service as on warships, and which will not be affected by violent shocks in such a way as to permit actuation by such shocks.

In the use of relays as heretofore constructed, under severe service conditions, much difficulty has been experienced because the relays when subjected to severe shocks would be moved or tripped in such a way as to close or open contacts at the wrong time. This often resulted in great damage. The principal reason for the responsiveness of the relays to severe shock is due to the inertia of the parts, particularly of the solenoid cores or plungers, which are relatively massive if the relay is to have ample power. The inertia of these plungers is such that when the relay is suddenly subjected to a shock, the plunger may move so as to actuate the relays unintentionally. In accordance with the present invention, a balanced system is provided utilizing either a plurality of solenoids so arranged that the plungers balance each other, or utilizing a solenoid or solenoids balanced against a counterweight. In either case, the relay is rendered highly shock-resistant.

Other objects of the invention are to provide a relay construction which is rugged and simple, and which may be readily adapted to operating a number of circuit-closing devices and with which circuit-controlling devices of standard construction may be utilized.

Other objects and advantages of the invention will appear in the course of the following description of one preferred embodiment of the invention chosen for purposes of illustration. It will be understood that the invention may be embodied in various forms other than that illustrated.

In the accompanying drawings which illustrate such preferred embodiment of the invention;

Fig. 3 is a transverse vertical section of the relay on the line 3—3 of Fig. 1;

Fig. 4 is a diagram showing the position of the cam and ball pin with switches in "off" position;

Fig. 5 is a diagram similar to Fig. 4 showing

2 the position of the cam corresponding with the closing of the switches;

Fig. 6 is a similar diagram showing the positions of the same parts when the solenoid plungers are fully retracted;

Figs. 7, 8, and 9 are plan views showing the positions of the cross lever corresponding with Figs. 4, 5, and 6, respectively.

Figure 10:
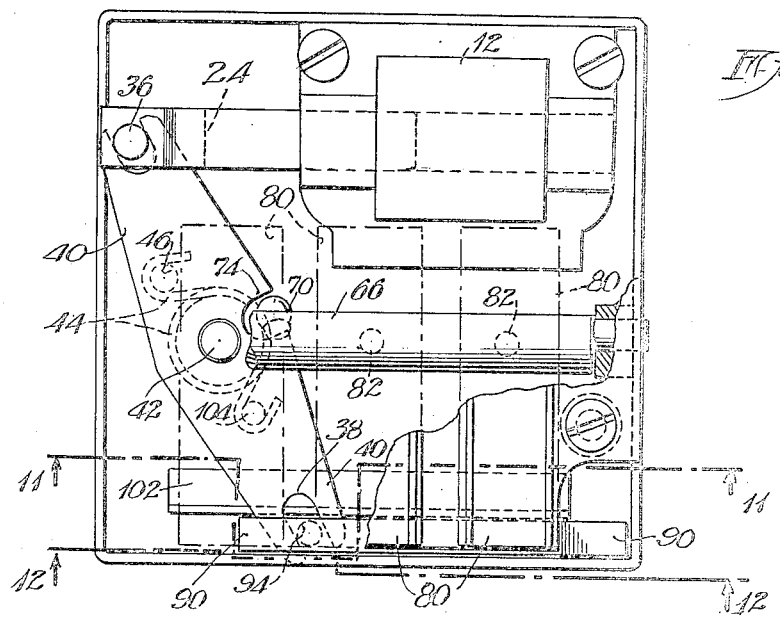
Figure 11:
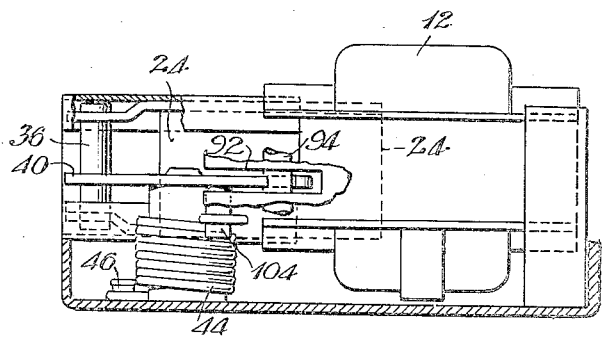
Figure 12:
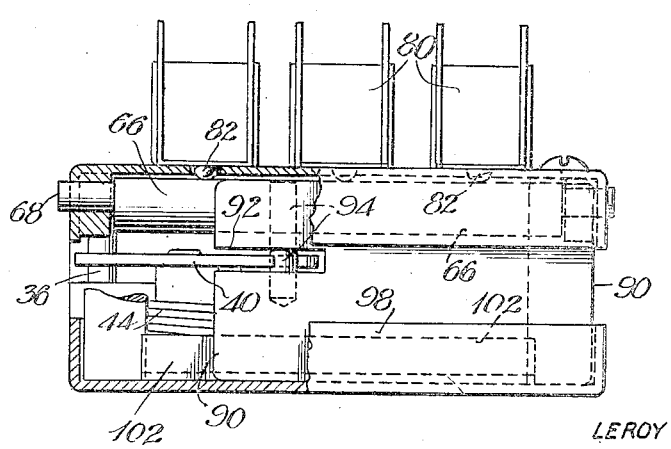

Fig. 10 is a plan view of a modified form of relay showing one solenoid counterbalanced by a counter-balance weight, the switch plate being removed and parts being indicated broken away;

Fig. 11 is a transverse vertical section of the relay taken on line 11—11 of Fig. 10, the switch plate and switches being omitted as in Fig. 10;

Fig. 12 is a transverse vertical section on the line 12—12 of Fig. 10, the switch plate and switches being shown.

Fig. 13 is an end elevation of a relay similar to that shown in Figs. 10, 11 and 12, but illustrating a different construction of switch, parts being broken away;

Fig. 14 is a plan view of the switch construction and operating lever shown in Fig. 13;

Fig. 15 is a side elevation of the switch construction shown in Figs. 13 and 14;

Fig. 16 is a plan view similar to Fig. 14 showing a modified drive for the switch; and Fig. 17 is a side elevation of the parts shown in Fig. 16.

Referring to the drawings in detail, the relay shown in Figs. 1 to 9 comprises a base 10 on which are mounted a pair of solenoids 12. The solenoids may be of any suitable construction. As illustrated, they comprise laminated core frames 14 mounted on the base or posts 16 to which they are held by screws 18. Within the frames are the solenoid coils 20 surrounding the usual central space 22 through the solenoid. Working in the spaces 33 but separated from the walls of the spaces by the usual air gaps are the solenoid plungers 24. These plungers are provided with guide extensions 26 which slide in guide frames 28 secured to the base 10 by screws 30. The extensions are shown as comprising frames consisting of longitudinal bars 32 connected by an end member 34. Mounted in each plunger extension is an operating pin 36; these pins engaging in slots 38 at the opposite ends of a cross lever 40 pivoted at its center on a fixed pivot 42 mounted in the base 10. The cross lever 40 is biased to move in a direction to draw the plungers out of the solenoid coils, by means of a coil spring 44 surrounding the pivot 42, the base of which is made of sufficient diameter to fill the spring and hold the coils thereof in alignment. The lower end of the spring is held by a suitable abutment such as the pin 46 mounted in the base 10, while the upper end of the spring is hooked as indicated at 48 and engages in a slot 50 in the cross lever.

It is to be particularly observed that the solenoids are oppositely placed on the base so that when they are simultaneously energized, the plungers move in opposite directions at equal speeds. Furthermore, the masses of the two plungers are balanced against each other through the cross lever. Thus, when the relay is subjected to any shock tending to move the plungers, the inertia of one plunger offsets the inertia of the other and the system comprising the movable plungers and the cross lever does not move. The plungers and cross lever will, therefore, move only in response to the pull of the solenoid coils when energized and in reverse direction by the biasing force of the spring 44 when the solenoid coils are de-energized. In the construction shown, the plungers of the two solenoids are of equal weight and the cross lever is pivoted at its center so that the system comprising the plungers and cross lever is balanced. If one solenoid had a heavier movable plunger than the other, then the cross lever should be pivoted at a point nearer to the heavier plunger to balance the moments of mass about the cross lever pivot.

The two solenoids and cross lever constitute the power element of the relay. The construction for mounting and operating the switches from the cross lever will now be described. A switch plate 60 is provided which is supported from the base in any suitable manner as by means of posts 62. The switch plate 60 has bearing ears 64 at each end thereof, preferably formed by bending extensions of the plate downwardly; journaled between these ears is a cam shaft 66 which has eccentric bearing pins or gudgeons 68 at each end thereof. For turning the cam shaft, a ball pin 70 is provided projecting from the cam shaft and having a ball-shaped head 72 adapted to work freely in a slot 74 in the side of the cross lever 40. Movement of the cross lever about its pivot 42 will thus rock the pin 70 and partially rotate the cam shaft 66 on its eccentric bearings 68. The switches or other devices to be operated by the relay are mounted on the switch plate. As shown, a plurality of standard pushbutton switches 80 are provided having suitable contacts therein (not necessary here to illustrate), and which are actuated by pushbuttons 82 projecting downwardly through openings in the switch plate and contacting with the surface of the cam shaft 66. Referring to Figs. 4, 5, and 6, if the cam shaft is rotated in a clockwise direction, it will contact the pushbuttons and force them up, thereby closing the switches. Preferably, in the final position shown in Fig. 6, travel of the cam is such as to pass beyond that required to actually close the switch contacts so as to hold the switches firmly closed and provide a safety factor which will prevent the switches from accidentally opening under the influence of shock or jarring. Some of the switches may be offset with respect to the other switches, as indicated in broken lines in Fig. 1 so as to clear the solenoid coils, thus providing for compact construction. Any number of switches may be utilized, depending upon the size of the switch plate and length of the cam shaft. The switches may be arranged so that all operate simultaneously, or in any desired sequence.

In operation, it will be seen that the closing of the circuit through the solenoid coils, which may be closed by any suitable control device located adjacent to or at a distance from the relay, will energize the solenoids and draw the plungers into the same. The position of the cross lever 40 when the plungers are drawn in is shown in dotted lines in Fig. 1. Breaking of the circuit through the solenoid coils permits the spring 44 to swing the cross lever to the full line position shown in Fig. 1 which withdraws the plungers from the solenoid coils. When the solenoid coils are thus de-energized, the cam shaft is rotated to the position shown in Fig. 4 and when the solenoids are energized, the cam is moved to the position shown in Fig. 6 thus pushing in the switch buttons.

Figs. 10, 11, and 12 show a modified construction of relay in which but a single solenoid 12 is used. Such construction is applicable where less power is required than in the double solenoid relay just described. In order to balance the inertia of the solenoid, a counterweight 90 is provided which is connected to the opposite arm of the cross lever 40 from that to which the plunger of the solenoid 12 is connected. The counterweight is shown as having a slot 92 formed therein across which passes a pin 94 which engages the slot 38 in the end of the cross lever. The counterweight is shown as guided between the outer flanges 96 and 98, respectively, on the switch plate and base and guide flanges 100 and 102 mounted on said members (see Fig. 13). The cross lever 40 is shown as biased by spring 44. In the particular construction shown, the end of the spring is connected to a pin 104 on the cross lever instead of being engaged in a notch on the latter as shown in Fig. 1.

Figure 1:
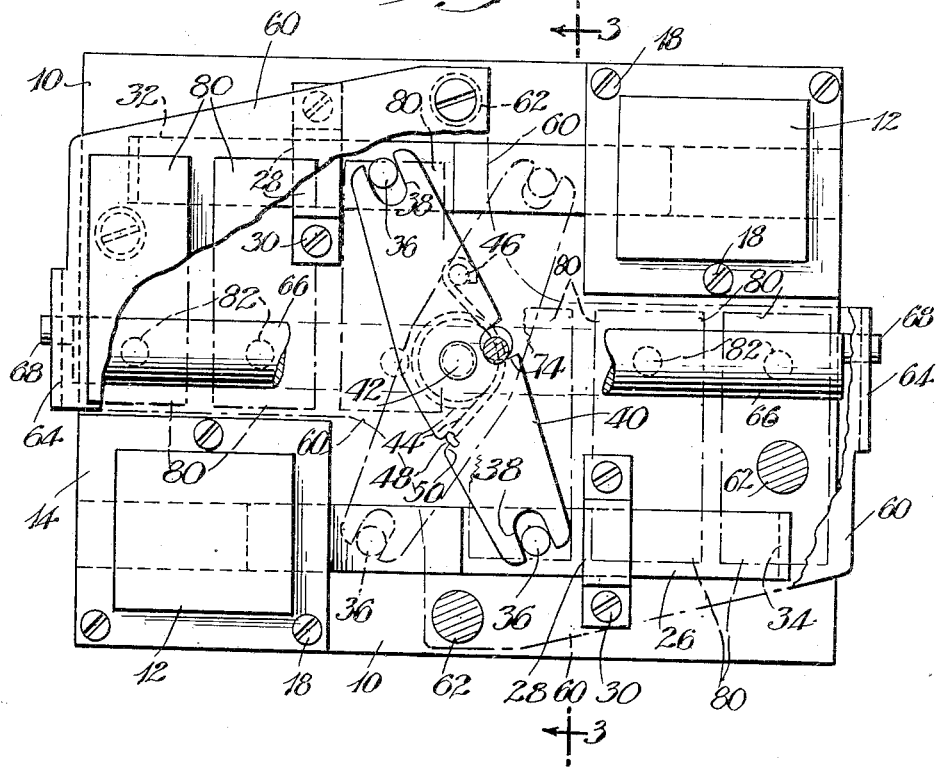
Fig. 1 is a plan view of the relay with parts broken away.
Figure 2:
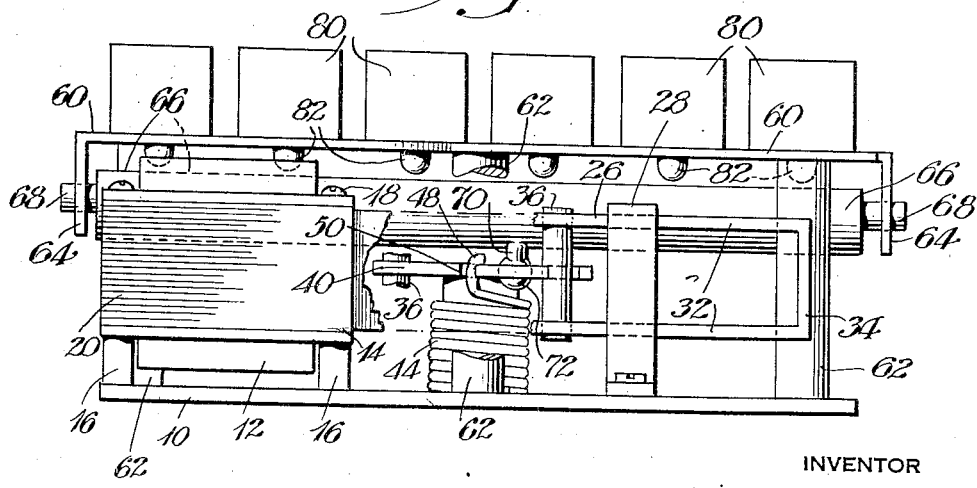
Fig. 2 is a side elevation of the relay with parts broken away.

The relay shown in Figs. 10, 11, and 12 being of smaller size than that shown in Figs. 1, 2, and 3, space is provided for holding three switches 80. These are operated by a cam shaft 66 having a ball pin 70 as described above.

The counterweight 90 is made of such weight as compared with the weight of the solenoid plunger that its moment about the pivotal axis of the cross lever 40 equals the moment of the solenoid plunger. In the instance shown, the cross lever has arms of equal length so that the counterweight will be of the same weight as that of the solenoid plunger. The counterweight acts to balance out the inertia effects in the case of shock, just as the two solenoid plungers do in the construction previously described.

Fig. 13 shows a relay construction similar to that shown in Figs. 10, 11, and 12 except that a different form of switch is mounted thereon. This figure shows a rotary switch, also illustrated in Figs. 14 and 15, which is mounted on a suitable bracket 110 on a switch plate 112. The rotary switch has a rotary shaft 120 actuating a plurality of switch arms moving over contacts within the switch discs 122. The switch arms and contacts are not illustrated as they may be of any standard construction. On the lower end of the shaft 120 is a collar 124 carrying a dog 126, downwardly projecting from which is a pin 128. This pin fits in the notch 74 of the cross lever 40 so that when the cross lever is rocked by the solenoid, the switch shaft 120 is rotated and the switch opened or closed as the case may be.

Figs. 16 and 17 show a switch construction similar to that shown in Figs. 14 and 15 except that mechanism is provided for making connection with multiple contacts in the switch in sequence. This is accomplished by rotating the switch shaft, step by step. The switch shown in Figs. 16 and 17 may be mounted on the relay as shown in Fig. 13, but in this instance the connection between the cross lever 140 and the switch shaft 120 is made by means of a pawl and ratchet. As illustrated, the cross lever 140 has a spring pressed pawl 142 pivoted thereon at 144. The shaft 120 has a toothed ratchet 146 fixed to its lower end, this ratchet having a plurality of teeth 148 corresponding in number to the number of switch positions. Each time the lever 140 is rocked backward and forward by the solenoid, it will advance the ratchet one tooth and consequently move the switch arm or arms one contact position to the next. It will be understood that the improved relay construction may be utilized for actuating other forms of switches.

While I have illustrated and described in detail certain preferred forms of my invention, it is to be understood that changes may be made therein and the invention embodied in other structures. I do not, therefore, desire to limit myself to the specific construction illustrated, but intend to cover my invention broadly in whatever form its principles may be utilized.

Having described my invention, what I claim is:

1. In a relay construction, a base, a pair of solenoids mounted thereon facing in opposite directions, plungers mounted to move into and out of the solenoids in opposite directions when the solenoids are energized or de-energized and a cross lever pivoted between its ends to a fixed pivot and pivotally connected at each of its ends to the plunger of one of said solenoids, a switch on said relay and an operative connection from said cross lever to said switch, said operative connection including a rotary cam member engaging a portion of said switch and an arm projecting from said cam member engaging said cross lever.

2. A relay of the character described, comprising a base, solenoids mounted on diagonally opposite corners of said base and facing in opposite directions with their axes parallel, plungers mounted to move in and out of said solenoids, a cross lever pivoted between its ends on a pivot mounted on said base, pivotal connections between said cross lever and the plungers of the respective solenoids, a biasing spring biasing said cross lever in a direction to move the plungers out of the solenoids, a switch plate mounted on said base and spaced from the same, a plurality of switches mounted on said switch plate and having operating buttons, a rotary cam shaft mounted in a position to engage said switch buttons, and a member projecting from said cam shaft and having operative connection with said cross lever whereby when said cross lever is swung about its pivot it will rotate said cam and actuate the switches.

3. A relay of the character described, comprising a base, solenoids mounted on diagonally opposite corners of said base and facing in opposite directions with their axes parallel, plungers mounted to move in and out of said solenoids, a cross lever pivoted between its ends on a pivot mounted on said base, pivotal connections between said cross lever and the plungers of the respective solenoids, a biasing spring biasing said cross lever in a direction to move the plungers out of the solenoids, a switch plate mounted on said base and spaced from the same, a plurality of switches mounted on said switch plate and having operating buttons, a camshaft mounted on eccentric bearings and adapted to engage said switch operating buttons and a ball pin projecting from said camshaft and having its head received in a recess in said cross lever.

4. A relay comprising a base plate, a switch plate mounted parallel to said base plate, but spaced therefrom, a plurality of switches mounted on said switch plate and having projecting operating members, a solenoid mounted between said base plate and switch plate with its axis parallel to said plates, said solenoid having a plunger moving axially therein, a lever operatively connected to said plunger and pivotally mounted upon a support carried by the base plate, a cam member mounted to rotate about an axis parallel to said plates and arranged to engage the operating members of said switches, and an operative connection between said pivoted lever and said cam member.

5. A relay comprising a base plate, a pair of solenoids mounted on diagonally opposite corners of said base plate with their axes parallel to the plate, plungers mounted to move axially into and out of said solenoids, said plungers being arranged to move in opposite directions parallel to the respective sides of the plates, a pivot mounted near the median line of the plate between the plungers, a cross lever pivoted at its center on said pivot, one end of said cross lever having a pivotal connection with each of said plungers, a switch plate mounted parallel to said base plate but spaced therefrom, a switch mounted on said switch plate having a projecting operating member, an elongated cam member mounted between said plates to rotate about an axis parallel thereto and having a cam surface adapted to engage the projecting operating member on the switch, and an operating arm projecting from said cam member and engaging in an opening near the center of said cross lever.

LEROY C. DOANE.

REFERENCES CITED

The following references are of record in the file of this patent:

UNITED STATES PATENTS

| Number | Name | Date |
| --- | --- | --- |
| 306,288 | Shaffer et al. | Oct. 7, 1884 |
| 521,925 | Wright | June 26, 1894 |
| 1,275,047 | Krantz | Aug. 6, 1918 |
| 1,508,442 | Burton | Sept. 16, 1924 |
| 1,954,689 | Allen | Apr. 10, 1934 |